United States Patent
Lee et al.

(10) Patent No.: US 8,607,038 B2
(45) Date of Patent: Dec. 10, 2013

(54) APPARATUS AND METHOD FOR DOWNLOADING CONTENTS USING AN INTERIOR MASS STORAGE IN A PORTABLE TERMINAL

(75) Inventors: Woo-Kwang Lee, Seoul (KR); Ra-Mi Jung, Gyeonggi-do (KR); Mi-Hee Seo, Gyeonggi-do (KR)

(73) Assignee: Samsung Electronics Co., Ltd., Yeoungtong-gu, Suwon-si, Gyeonggi-do (KR)

( * ) Notice: Subject to any disclaimer, the term of this patent is extended or adjusted under 35 U.S.C. 154(b) by 735 days.

(21) Appl. No.: 12/696,258

(22) Filed: Jan. 29, 2010

(65) Prior Publication Data

US 2010/0199081 A1   Aug. 5, 2010

(30) Foreign Application Priority Data

Jan. 30, 2009   (KR) .................. 10-2009-0007267

(51) Int. Cl.
*G06F 9/00* (2006.01)
*G06F 15/177* (2006.01)

(52) U.S. Cl.
USPC .................. 713/2; 713/1; 713/100

(58) Field of Classification Search
USPC .................................. 713/1, 2, 100
See application file for complete search history.

(56) References Cited

U.S. PATENT DOCUMENTS

| | | | |
|---|---|---|---|
| 6,718,401 B2 * | 4/2004 | Nalawadi et al. | 710/13 |
| 7,797,527 B2 * | 9/2010 | Duncan | 713/2 |
| 7,908,466 B2 * | 3/2011 | Oh et al. | 713/1 |
| 2005/0120384 A1 * | 6/2005 | Stone et al. | 725/132 |
| 2005/0159150 A1 * | 7/2005 | Roh et al. | 455/428 |
| 2005/0262297 A1 * | 11/2005 | Arakawa et al. | 711/112 |
| 2006/0136706 A1 * | 6/2006 | Montgomery et al. | 713/2 |
| 2007/0061559 A1 * | 3/2007 | Kwon et al. | 713/1 |
| 2007/0113067 A1 * | 5/2007 | Oh et al. | 713/2 |
| 2009/0318134 A1 * | 12/2009 | Chao | 455/425 |
| 2011/0158202 A1 * | 6/2011 | Ozukturk et al. | 370/335 |

* cited by examiner

*Primary Examiner* — Jaweed A Abbaszadeh
(74) *Attorney, Agent, or Firm* — Cha & Reiter, LLC

(57) ABSTRACT

A method and apparatus for downloading content to a large-capacity internal memory in a portable terminal are provided. The method includes performing a booting process of the portable terminal at the occurrence of a booting event, examining whether a Universal Serial Bus (USB) port is enabled during the booting process, if the USB port is enabled, receiving data through the USB port before driver loading, and storing the received data into the large-capacity internal memory and performing the booting process.

16 Claims, 8 Drawing Sheets

APPARATUS AND METHOD FOR DOWNLOADING CONTENTS USING AN INTERIOR MASS STORAGE IN A PORTABLE TERMINAL

CLAIM OF PRIORITY

This application claims, under 35 U.S.C. §119(a), priority to and the benefit of the earlier filing date, of, that patent application filed in the Korean Intellectual Property Office on Jan. 30, 2009 and assigned Serial No. 10-2009-0007267, the entire disclosure of which is hereby incorporated by reference.

BACKGROUND OF THE INVENTION

1. Field of the Invention

The present invention relates to the field of portable terminals and more particularly, to an apparatus and method for downloading content to an interior mass storage during booting of a portable terminal.

2. Description of the Related Art

With the advancement in the communication industry, a large-capacity memory card (e.g., MoviNAND™ and INAND™) have been developed and are currently being made available to the general public. Thus, there is a trend in which most recently released portable terminals are embedded with a large-capacity memory card. The MoviNAND™ and INAND™ imply embedded NAND flash memories using a Secure Digital (SD)/Multi-Media Card (MMC) interface protocol. MoviNAND™ is a trademark of the Samsung Semiconductor Co, Gyeonggi-Do, Korea. INAND™ is a trademark of SanDisk Corporation, Milpitas, Calif., USA.

As the recently released portable terminals may include a large-capacity internal memory card, there is ongoing discussion on a technique by which a large-capacity memory space may be utilized by allowing various files or content to be pre-stored in the portable terminal when releasing the portable terminal.

However, a downloader used in the portable terminal according to the prior art can download only a boot loader and an Operation System (OS) image, and such a downloader is limited to a Single Level Cell (SLC) memory having a memory interface such as OneNAND™. Therefore, in order to store content into the large-capacity internal memory of the portable terminal according to the prior art, the content may be stored in the portable terminal by using active synchronization with an external computer system or a large-capacity storage function after booting of the portable terminal is complete. OneNAND™ is a trademark of the Samsung Semiconductor Co, Gyeonggi-Do, Korea.

However, a scheme of downloading content after completion of the booting of the portable terminal has a demerit in that manufacturing speed and efficiency are decreased in an actual mass-production process and in that data cannot be downloaded until the booting of the portable terminal is complete.

SUMMARY OF THE INVENTION

An aspect of the present invention is to provide a method and apparatus for downloading content into a large-capacity internal memory in a portable terminal.

Another aspect of the present invention is to provide a method and apparatus for downloading content to a large-capacity internal memory before booting is complete in a portable terminal.

Another aspect of the present invention is to provide a method and apparatus for managing a plurality of content by grouping the content into one group in a portable terminal.

Another aspect of the present invention is to provide a method and apparatus for avoiding deletion of content by storing a version of a downloaded file and a content list included in the file in a portable terminal.

A method of downloading content to a large-capacity internal memory in a portable terminal is provided. The method includes performing a booting process of the portable terminal at the occurrence of a booting event, examining whether a Universal Serial Bus (USB) port is enabled during the booting process, if the USB port is enabled, receiving data from a computer system through the USB port before driver loading, and storing the received data into the large-capacity internal memory and performing the booting process.

In accordance with an aspect of the present invention, a method of downloading content from a computer system to a portable terminal is provided. The method includes generating a binary file including content to be downloaded to the portable terminal, examining whether a USB port is enabled during a booting process of the portable terminal, and if the USB port is enabled, transmitting the binary file to the portable terminal by using a USB downloader before a driver loading process of the portable terminal.

In accordance with another aspect of the present invention, an apparatus for downloading content to a large-capacity internal memory in a portable terminal is provided. The apparatus includes a controller for performing a booting process of the portable terminal at the occurrence of a booting event and for examining whether a USB port is enabled during the booting process, a communication unit for receiving data from a computer system through the USB port if the USB port is enabled under the control of the controller, and a large-capacity internal memory for storing the received data under the control of the controller.

In accordance with another aspect of the present invention, an apparatus for downloading content from a computer system to a portable terminal is provided. The apparatus includes a controller for generating a binary file including content to be downloaded to the portable terminal and for examining whether a USB port is enabled during a booting process of the portable terminal, and a communication unit for transmitting the binary file to the portable terminal by using a USB downloader under the control of the controller if the USB port is enabled.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

DETAILED DESCRIPTION OF THE INVENTION

The following description, with reference to the accompanying drawings, is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions may be omitted for clarity and conciseness so as not to obscure appreciation of the subject matter of the present invention by a person of ordinary skill in the art.

The present invention described hereinafter relates to a method and apparatus for downloading content to a large-capacity internal memory before completion of booting in a portable terminal, and for managing a version and file list for the downloaded content. The large-capacity internal memory implies an embedded NAND flash memory using a Secure Digital (SD)/Multi-Media Card (MMC) interface protocol, and thus it will be described by taking a MoviNAND memory for example. Although a portable terminal supporting a WINDOWS Mobile 6 system will be described for example, the present invention is also applicable to other portable terminals supporting other systems. WINDOWS is a registered trademark of Microsoft Corporation, Bellevue, Wash., USA.

Figure 1:
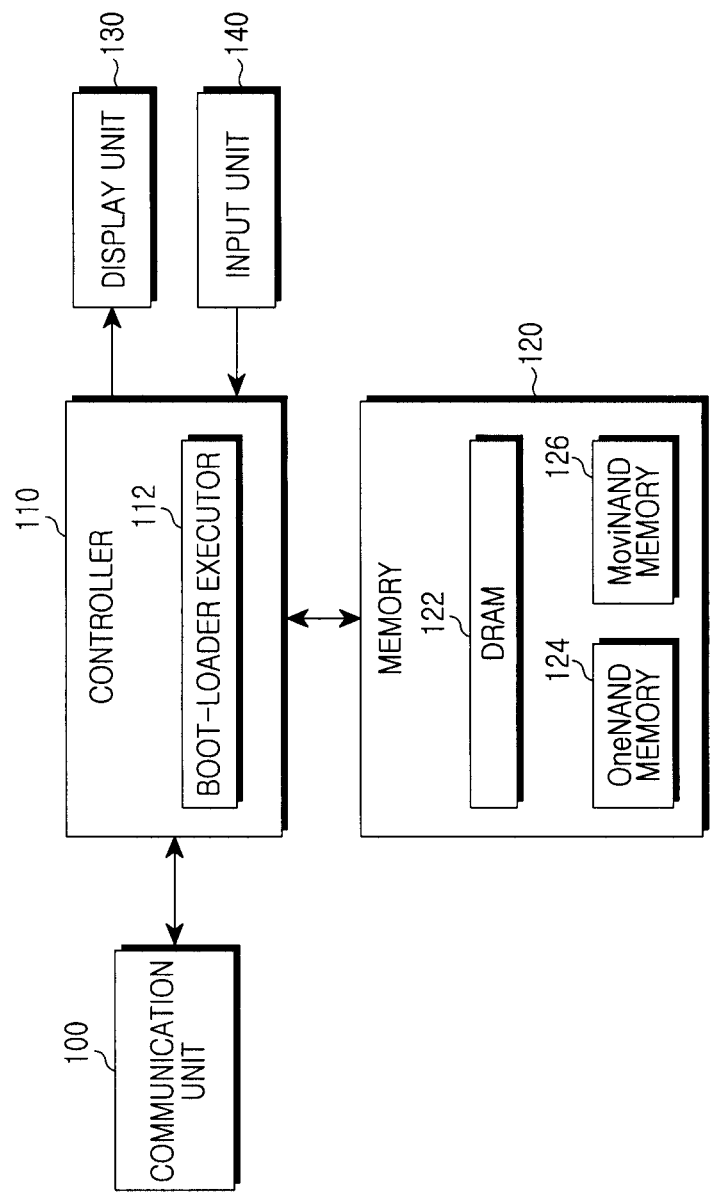
FIG. 1 is a block diagram of a portable terminal according to an exemplary embodiment of the present invention.

FIG. 1 is a block diagram of a portable terminal according to an exemplary embodiment of the present invention.

Referring to FIG. 1, the portable terminal includes a communication unit 100, a controller 110, a memory 120, a display unit 130, and an input unit 140. In particular, according to the present invention, the controller 110 includes a boot-loader executor 112, and the memory 120 includes a Dynamic Random Access Memory (DRAM) 122, and at least one high capacity embedded memory, such as OneNAND™ memory 124, and a MoviNAND™ memory 126.™

The communication unit 100 processes transmission/reception of data signals, which are input and output through an antenna, for example, and processes a signal transmitted to and received from a downloader of a computer system connected to a Universal Serial Bus (USB) port. In particular, when the USB port is open under the control of the controller 110 during booting of the portable terminal, the communication unit 100 receives file data from the downloader of the computer system and provides the file data to the controller 110.

The controller 110 controls the overall operation of the portable terminal. According to the present invention, the controller 110 receives a file from the downloader of the computer system during the booting of the portable terminal and controls the execution of one or more functions for storing the received file into the MoviNAND™ memory 126. More specifically, the controller 110 includes boot-loader executor 112 to perform a process for booting the portable terminal, and thus, when the USB port is open during the booting process, the controller 110 receives file data from the downloader of the computer system, temporarily stores the received file data into the DRAM 122, configures an SD/MMC interface, and stores the file data, which is temporarily stored in the DRAM 122, into the MoviNAND™ memory 126.

Figure 2:
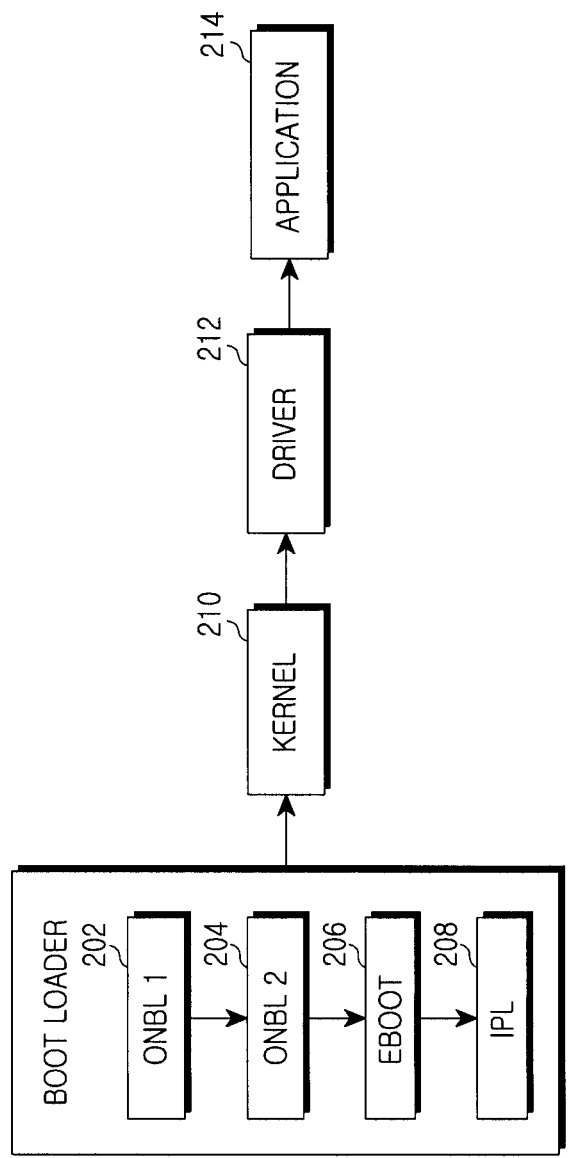
FIG. 2 illustrates a booting process of a boot-loader executor in a portable terminal according to an exemplary embodiment of the present invention.

The boot-loader executor 112 performs the booting process as shown in FIG. 2. More specifically, the boot-loader executor 112 performs a booting process in the order of a OneNAND™ Boot Loader 1 (ONBL1) 202, a OneNAND™ Boot Loader 2 (ONBL2) 204, an Ethernet BOOT loader (EBOOT) 206, an Initial Program Loader (IPL) 208, a kernel 210, a driver 212, and an application 214.

More specifically, in the booting process, the boot-loader executor 112 enables the DRAM 122 by using the ONBL1 202 driven in a Static Random Access Memory (SRAM, not shown) region located inside a Central Processing Unit (CPU) so that it can be branched to the ONBL2 204. The boot-loader executor 112 sets a CPU clock by using the ONBL2 204 driven in the DRAM 122 located outside the CPU to allow the use of a basic General Purpose Input Output (GPIO) process. Thereafter, by using the EBOOT 206, the boot-loader executor 112 initializes most of hardware components, checks whether the initialized hardware components are operating, and controls the USB port to allow USB download. In this case, the boot-loader executor 112 examines a presence, or absence, of data to be downloaded through the USB port according to the present invention. In the presence of the data, the boot-loader executor 112 receives the data through the USB port and temporarily stores the data into the DRAM 122. Thereafter, the boot-loader executor 112 configures an SD/MMC interface to allow access to the MoviNAND™ memory 126, reads out the data temporarily stored in the DRAM 122 and then stores the read-out data into the MoviNAND™ memory 126. In this case, the boot-loader executor 112 may determine a start address and size of the DRAM 122 so that the data temporarily stored in the DRAM 122 is read out by that size according to a First Input First Output (FIFO) algorithm and is then concurrently written into the MoviNAND™ memory 126. That is, the present invention supports multiple block writing, and thus data of 32 MB can be written concurrently. In this case, a size of data that can be concurrently written may differ according to a configuration.

Thereafter, upon completion of an operation of the EBOOT 206, the boot-loader executor 112 determines whether an image update function will be used by using the IPL 208. If it is determined that the image update function is used, the boot-loader executor 112 performs an operation for updating a specific area of an Operation System (OS) image. Otherwise, if it is determined that the image update function is not used, the boot-loader executor 112 calls a kernel 210. Thereafter, the boot-loader executor 112 loads a driver 212 and a basic application 214.

The memory 120 stores a variety of programs and data required for an overall operation of the portable terminal. According to the present invention, the memory 120 includes the DRAM 122, the OneNAND™ memory 124, and the MoviNAND™ memory 126. The DRAM 122 temporarily stores data received through the USB port during the booting process under the control of the controller 110. The OneNAND™ memory 124 stores a program and data for operating the boot-loader executor 112. The MoviNAND™ memory 126 receives the data temporarily stored in the DRAM 122 during the booting process through the SD/MMC interface under the control of the controller 110 and stores the received data.

Returning to FIG. 1, the display unit 130 displays status information generated during the operation of the portable terminal and limited alphanumeric characters. Further, the display unit 130 displays version information and a list of content stored in the MoviNAND™ memory 126 under the control of the controller 110.

The input unit 140 includes various keys to input alphanumeric information and outputs functions corresponding to the keys input by the user to the controller 110.

Figure 3:
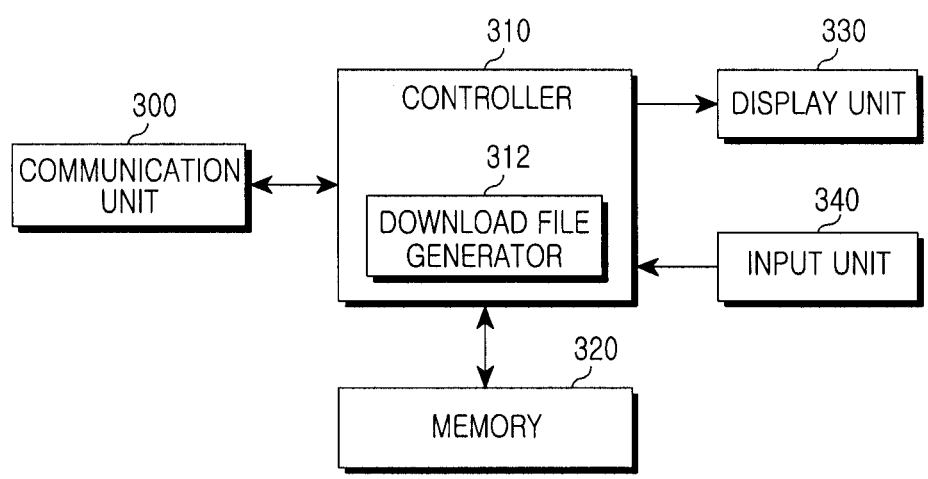
FIG. 3 is a block diagram of a computer system according to an exemplary embodiment of the present invention.

FIG. 3 is a block diagram of a computer system according to an exemplary embodiment of the present invention.

Referring to FIG. 3, the computer system includes a communication unit 300, a controller 310, a memory 320, a display unit 330, and an input unit 340. According to the present invention, the controller 310 includes a download file generator 312.

The communication unit 300 processes a signal transmitted to and received from the portable terminal connected through the USB port. In particular, when the USB port of the portable terminal is open under the control of the controller 310, the communication unit 300 transmits generated file data.

The controller 310 controls an overall operation of the computer system. According to the present invention, the controller 310 includes the download file generator 312 to generate binary file(s) including content (e.g., music, still pictures, motion pictures, games, multi-lingual support binary systems, navigations, etc.) selected by a user and to control and process a function for downloading the generated binary file to the portable terminal by using a USB downloader. The USB downloader obtains a register value (i.e., a Canonically Signed Digit (CSD)) having sector number information of the MoviNAND™ memory 126 included in the portable terminal and automatically sets a total number of sectors suitable for the MoviNAND™ memory 126 when the binary file is downloaded. Accordingly, the USB downloader generates only one binary file without having to additionally generate the binary file according to a type of a large-capacity internal memory included in the portable terminal.

That is, the download file generator 312 generates a base file representing selected content or a list of content included in a selected folder, and generates the content and the generated base file into one binary file according to a File Allocation Table (FAT) 32 format. Herein, the base file indicates content that must not be deleted even if the portable terminal is initialized after the binary file is downloaded to the portable terminal. The base file includes version information in addition to the list of the content. The base file may be configured to a hidden file format so as not to be displayed in the portable terminal, and information included in the base file is set to be invisible when it is accessed by using a general text editor by performing a bit operation. In addition, the FAT32 is a file system devised by Microsoft Corporation in 1996. The FAT32 supports a long file name and a driver having a size of up to 2 TeraBytes (TB).

Although it has been described above that the binary file is generated according to the FAT32 format for example since most of portable terminals recently provided use the FAT32, the binary file may be generated according to a format of another file system format.

The memory 320 stores a program for an overall operation of the computer system and a variety of data. Further, the memory 320 stores various content, and stores the binary file generated by the download file generator 312.

The display unit 330 displays status information generated during the operation of the portable terminal and limited alphanumeric characters. The input unit 340 includes various keys to input alphanumeric information and outputs functions corresponding to the keys input by the user to the controller 310.

Figure 4:
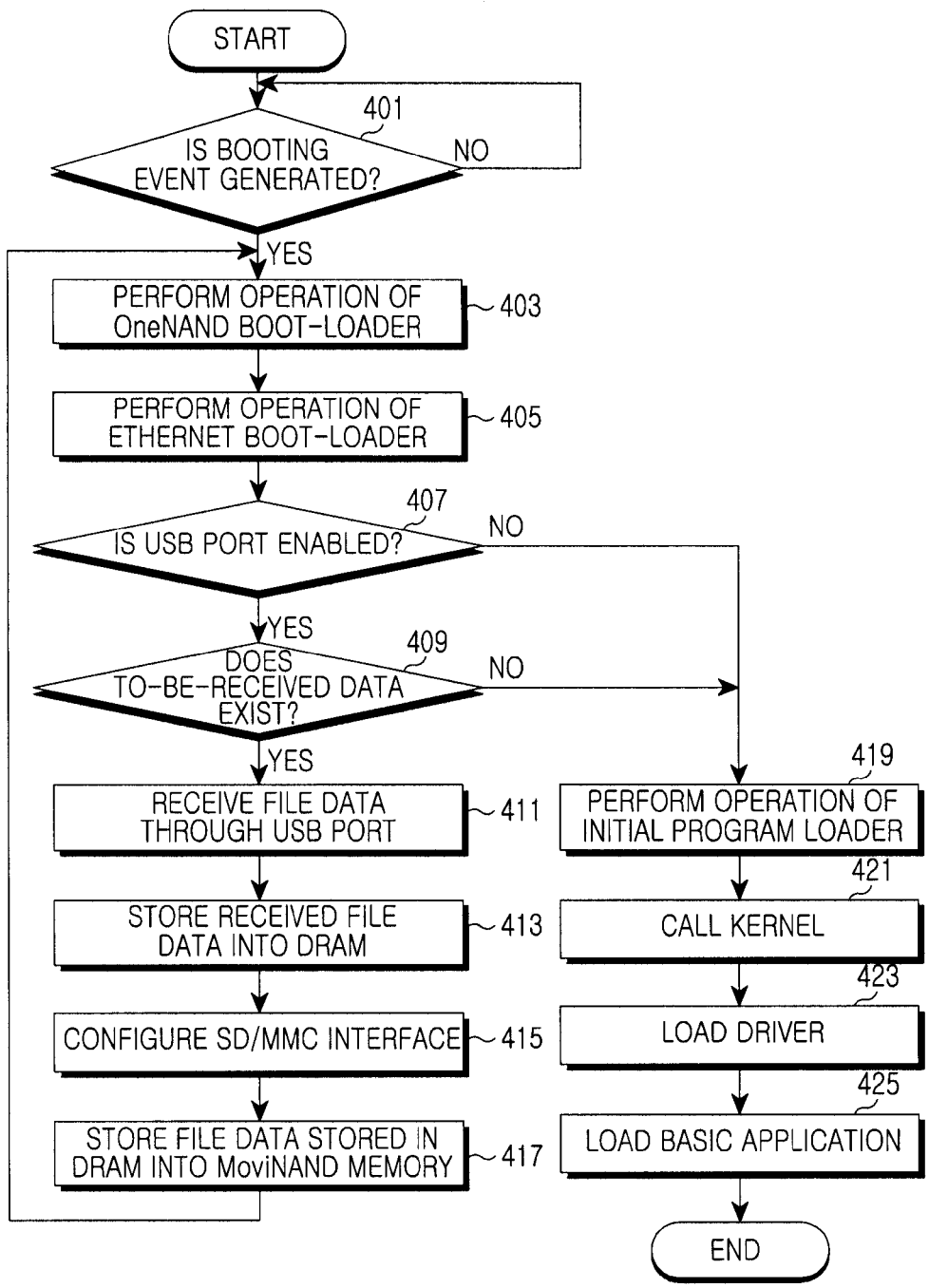
FIG. 4 is a flowchart illustrating a process of operating a portable terminal according to an exemplary embodiment of the present invention.

FIG. 4 is a flowchart illustrating a process of operating a portable terminal according to an exemplary embodiment of the present invention.

Referring to FIG. 4, when a booting event occurs in step 401, the portable terminal performs an operation of a OneNAND™ boot-loader in step 403. That is, the portable terminal enables the DRAM 122 by using the OneNAND™ boot-loader, sets a CPU clock, and allows the use of a basic GPIO.

In step 405, the portable terminal performs an operation of an Ethernet boot-loader. That is, the portable terminal performs the operation of the Ethernet boot loader for initializing most of hardware components, checking whether the initialized hardware components is operating, and controlling the USB port to enable USB download.

Thereafter, the portable terminal examines whether the USB port is enabled in step 407. If the USB port is not enabled, the procedure proceeds to step 419. Otherwise, if the USB port is enabled, the procedure proceeds to step 409, the portable terminal examines whether there is data to be received through the USB port. If there is no data to be received, the procedure proceeds to step 419. Otherwise, if there is the data to be received, the procedure proceeds to step 411, the portable terminal receives file data through the USB port. In this case, the received file data may be a binary file with an FAT 32 format. The binary file includes a plurality of content and also includes a base file indicating version information and a list of the included content.

The portable terminal temporarily stores the received file data into the DRAM 122 in step 413, configures an SD/MMC interface to allow an access to the MoviNAND™ memory 126 in step 415, and thereafter reads out the file data temporarily stored in the DRAM 122 and stores the read-out file data into the MoviNAND™ memory 126 in step 417. In this case, the portable terminal may determine a start address and size of the DRAM 122 so that the data temporarily stored in the DRAM 122 is read out by that size according to a FIFO algorithm and is then concurrently written into the MoviNAND™ memory 126. That is, the present invention supports multiple block writing, and thus data of 32 MB, or other similar size, can be written concurrently. In this case, a size of data that can be concurrently written may differ according to a configuration. Therefore, the present invention has an advantage in that a data access speed is faster than that of the conventional technique in which a size of data that can be concurrently written to the large-capacity internal memory is limited to a size of one cluster. Thereafter, returning to step 403, the portable terminal re-performs the operation of the OneNAND™ boot-loader. That is, upon completion of an operation of storing data into the MoviNAND™ memory 126, the portable terminal re-performs a booting process on the OneNAND™ memory 124.

Meanwhile, if the examination result of step 407 shows that the USB port is not enabled or if the examination result of step 409 shows that there is no data to be received, proceeding to step 419, the portable terminal determines whether an image update function is used and performs an operation of an initial program loader for performing an operation depending on the determination result. The portable terminal calls a kernel in step 421, loads a driver in step 423, and loads a basic application in step 425. Thereafter, the procedure of FIG. 4 ends.

Figure 8:
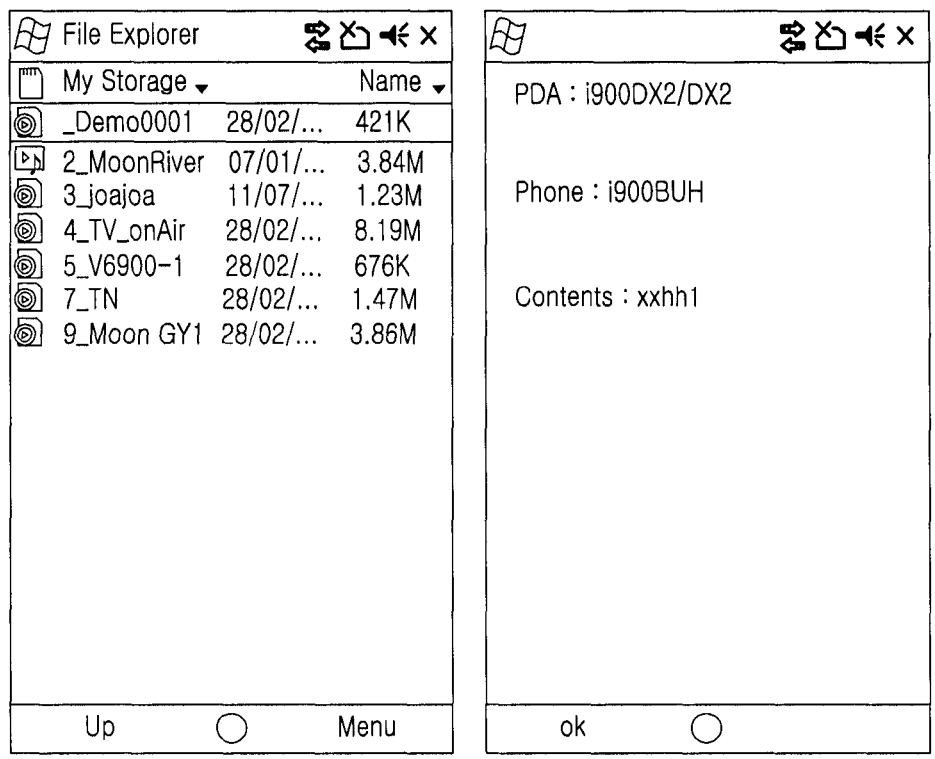
FIG. 8 illustrates a screen for managing a version and file list for download content in a portable terminal according to an exemplary embodiment of the present invention.

Herein, after the completion of the booting process, the portable terminal may analyze the file data (i.e., binary file) stored in the MoviNAND™ memory 126 and display content included in the binary file and version information as shown in FIG. 8. In this case, as shown in FIG. 8, the base file included in the binary file may be set to a hidden file format and thus may not be displayed on the display unit 130 of the portable terminal.

Figure 5:
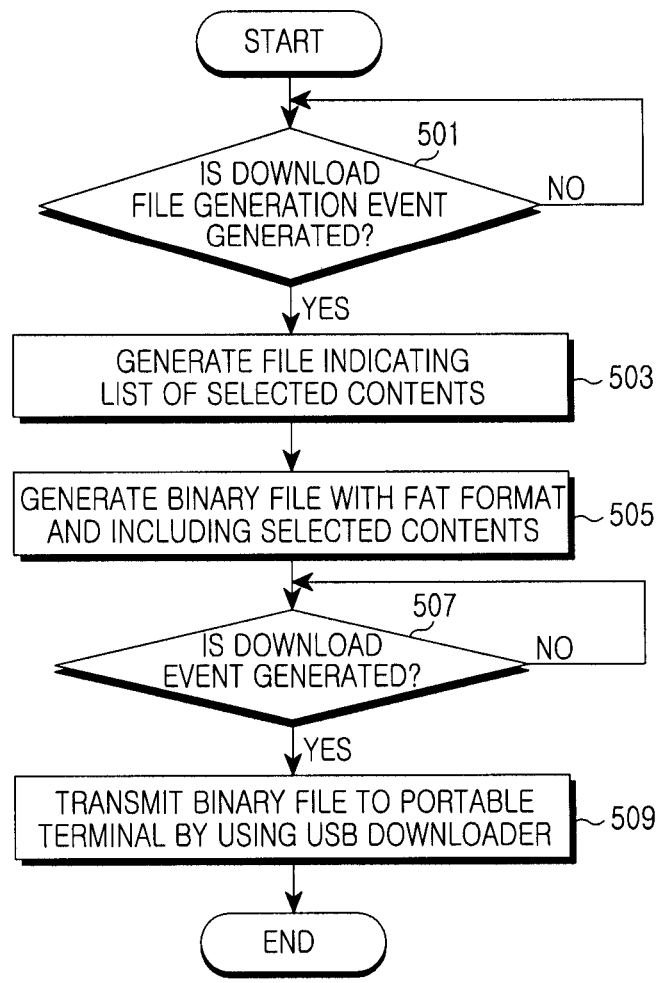
FIG. 5 is a flowchart illustrating a process of operating a computer system according to an exemplary embodiment of the present invention.

FIG. 5 is a flowchart illustrating a process of operating a computer system according to an exemplary embodiment of the present invention.

Figure 6:
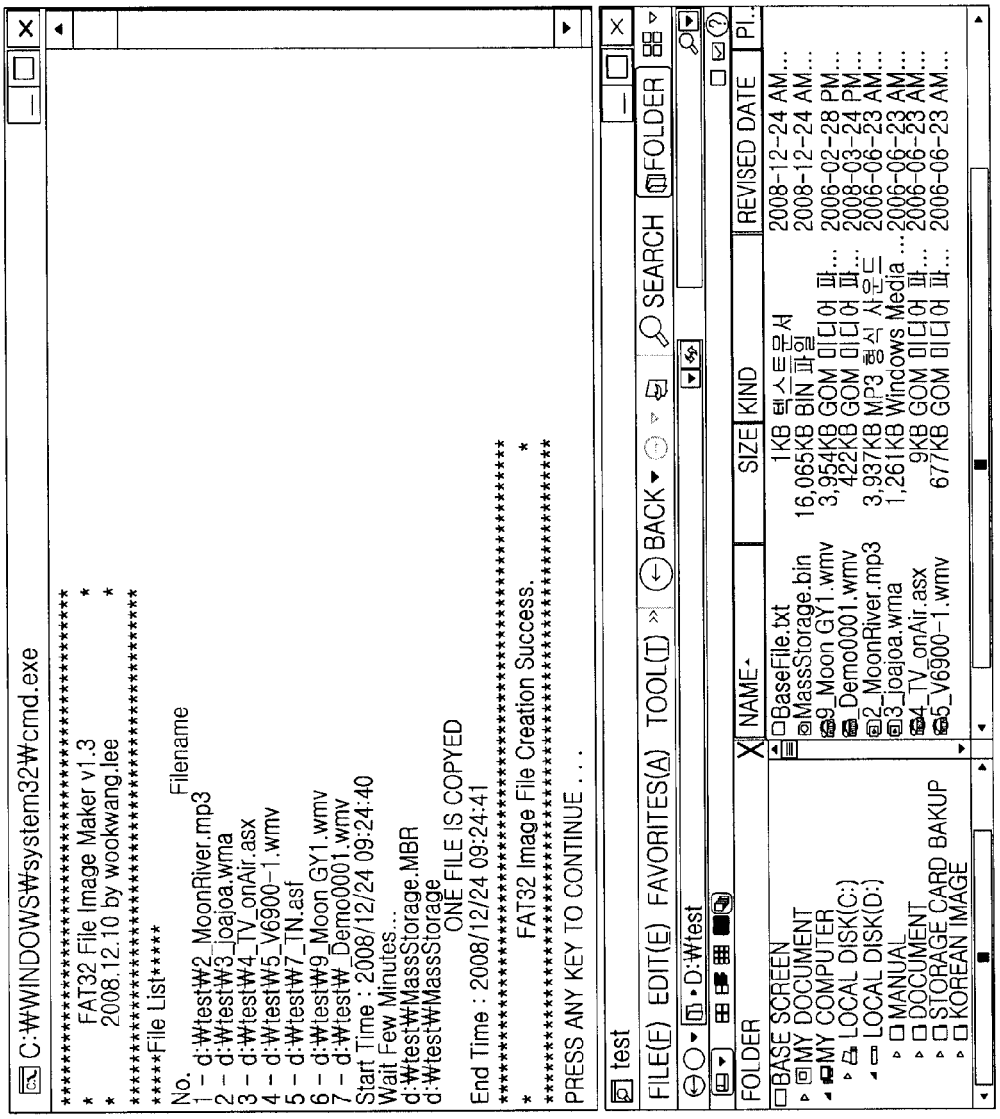
FIG. 6 illustrates a screen for generating a file to be downloaded from a computer system to a portable terminal according to an exemplary embodiment of the present invention.
Figure 7A:
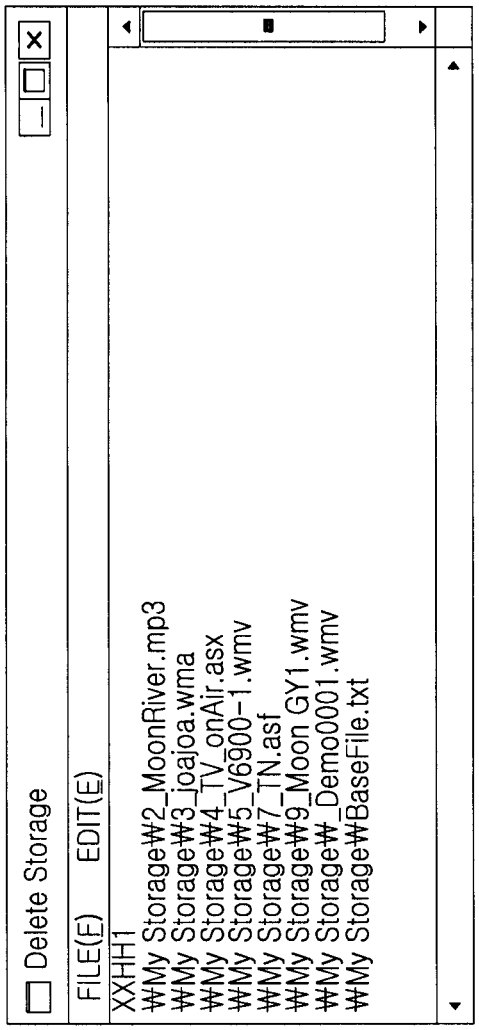
FIGS. 7A and 7B illustrate a download content management file generated in a computer system according to an exemplary embodiment of the present invention.
Figure 7B:
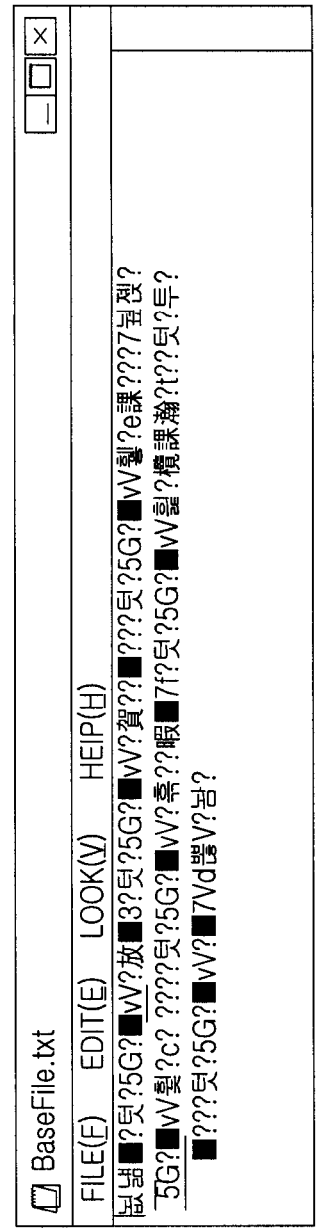

Referring to FIG. 5, when a download file generation event occurs by a user (for example, upon input by a user) in step 501, the computer system generates a base file indicating content selected by a user or a list of content included in a selected folder in step 503. Thereafter, in step 505, the computer system generates the selected content and the generated base file into one binary file according to the FAT32 format. The base file is a file indicating content that must not be deleted even if the portable terminal is in a jig-on state in a manufacturing process or a hard reset is performed. The base file may include version information of a binary file in addition to the list of the content, and may be configured not to display its content information when accessed by using a general text editor by performing a bit operation. Further, the base file may be configured to a hidden file format so that it is not displayed in the portable terminal. For example, when the download file generation event occurs, as shown in FIG. 6, the computer system generates a base file "BaseFile.txt" including version information and a list of content existing in a "test" folder, and thereafter generates the content and the base file into a binary file "MassStorage.bin" according to the FAT32 format. As shown in FIG. 7A, the base file "BaseFile.txt" includes a version of the binary file and a list of the content. Thus, when accessed by using the general text editor, the base file is displayed as shown in FIG. 7B (for example).

Returning to FIG. 5, in step 507, the computer system examines whether a download event occurs. At the occurrence of the download event, the procedure proceeds to step 509, the computer system transmits the binary file to the portable terminal by using the USB downloader. In this case, the computer system transmits the binary file by using the USB downloader after waiting until the USB port of the portable terminal is enabled instead of waiting until booting of the portable terminal is complete. The USB downloader obtains a register value (i.e., a Canonically Signed Digit (CSD)) having sector number information of the MoviNAND™ memory 126 included in the portable terminal and automatically sets a total number of sectors suitable for the MoviNAND™ memory 126 when the binary file is downloaded.

Thereafter, the procedure of FIG. 5 ends.

According to exemplary embodiments of the present invention, content are downloaded to a large-capacity internal memory before completion of booting of a portable terminal. Thus, when the terminal is manufactured in a mass-production process, various content can be stored without wasting memory space of the large-capacity internal memory, and productivity can be improved by decreasing a processing time. Further, software upgrades can be achieved by a user faster than the case of using the conventional method, and it is helpful to allow data downloading. In addition, the present invention can avoid deletion of a file even if a hard reset is performed in a mass-production process by managing a version and file list of downloaded content.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. As would be recognized by those skilled in the art, when a general purpose computer is loaded with, or accesses, software or code for implementing the processing shown herein, the general purpose computer is transformed into a special purpose computer that may at least perform the processing shown herein.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

What is claimed is:

1. A method of downloading content to a large-capacity internal memory in a portable terminal, the method comprising:
    performing a booting process of the portable terminal at the occurrence of a booting event;
    examining whether a Universal Serial Bus (USB) port is enabled during the booting process:
    if the USB port is enabled, receiving data through the USB port before driver loading; and
    storing the received data into the large-capacity internal memory and re-performing the booting process using a program and data stored in other internal memory without using data stored in the large-capacity internal memory, wherein the other internal memory stores the program and data for the booting process,
    wherein the booting process comprises:
    performing an operation of a OneNAND™ boot-loader for setting a clock by enabling a Dynamic Random Access Memory (DRAM) and for enabling a General Purpose Input Output (GPIO); and
    performing an operation of an Ethernet boot-loader for initializing hardware components,
    wherein the USB port is enabled during the performing of the operation of the Ethernet boot-loader.

2. The method of claim 1, wherein the large-capacity internal memory is an embedded NAND flash memory using an SD/MMC interface protocol.

3. A method of downloading content to a large-capacity internal memory in a portable terminal, the method comprising:
    performing a booting process of the portable terminal at the occurrence of a booting event;
    examining whether a Universal Serial Bus (USB) port is enabled during the booting process;

if the USB port is enabled, receiving data through the USB port before driver loading; and storing the received data into the large-capacity internal memory and re-performing the booting process using a program and data stored in other internal memory without using data stored in the large-capacity internal memory the other internal memory stores the program and data for the booting process, wherein the storing of the received data into the large-capacity internal memory comprises:

temporarily storing the data received through the USB port into a DRAM;

configuring a Secure Digital/Multimedia Card (SD/MMC) interface for accessing to the large-capacity internal memory; and reading out the data temporarily stored in the DRAM and storing the data into the large-capacity internal memory through the SD/MMC interface.

4. The method of claim 3, wherein the storing of the data temporarily stored in the DRAM into the large-capacity internal memory comprises:

determining a start address and a size of the DRAM;

reading out data from the DRAM by the determined size in a First Input First Output (FIFO) manner starting from the start address; and writing the read-out data into the large-capacity internal memory.

5. A method of downloading content from a computer system to a portable terminal, the method comprising:

generating a binary file comprising content to be downloaded to the portable terminal;

examining whether a Universal Serial Bus (USB) port is enabled during a booting process of the portable terminal; and transmitting prior to the booting process of portable terminal being completed the binary file to a large-capacity internal memory of the portable terminal using a USB downloader before a driver loading process of the portable terminal, wherein the USB downloader obtains a register value having sector number information of the large-capacity internal memory of the portable terminal and sets a total number of sectors to the obtained value when the binary file is downloaded, wherein the booting process comprises:

performing an operation of a OneNAND™ boot-loader for setting a clock by enabling a Dynamic Random Access Memory(DRAM) and for enabling a General Purpose Input Output (GPIO); and performing an operation of an Ethernet boot-loader for initializing hardware components, wherein the USB port enabled during the performing of the operation of the Ethernet boot-loader.

6. The method of claim 5, wherein the generating of the binary file comprises:

generating a base file for indicating version information and a list of selected content; and generating a binary file comprising the selected content and the base file.

7. The method of claim 6, wherein the base file is a file for indicating content which must not be deleted.

8. A portable terminal, comprising:

a controller for performing a booting process of the portable terminal at the occurrence of a booting event, for examining whether a Universal Serial Bus (USB) port is enabled during the booting process, for storing the received data into the large-capacity internal memory and for re-performing the booting process using a program and data stored in other internal memory without using data stored in the large-capacity internal memory;

a communication unit for receiving data through the USB port if the USB port is enabled including prior to the booting process of the portable terminal being completed and before driver loading;

a large-capacity internal memory for storing the received data under the control of the controller; and the other internal memory for storing the program and data for the booting process, wherein the controller performs an operation of a OneNAND™ boot-loader for setting a clock by enabling a Dynamic Random Access Memory (DRAM) and for enabling a General Purpose Input Output (GPIO), performs an operation of an Ethernet boot-loader for initializing hardware components, and detects whether the USB port is enabled during the operating of the Ethernet boot-loader.

9. The portable terminal of claim 8, wherein the controller provides control such that data is received through the USB port before driver loading during a booting process of the portable terminal and the data is stored in the large-capacity internal memory.

10. The apparatus of claim 8, wherein the large-capacity internal memory is an embedded NAND flash memory using an SD/MMC interface protocol.

11. A portable terminal, comprising:

a controller for performing a booting process of portable terminal at the occurrence of a booting event, for examining whether a Universal Serial Bus (USB) port is enabled during the booting process, for storing the received data into the large-capacity internal memory and for re-performing the booting; process using a program and data stored in other internal memory without using data stored in the large-capacity internal memory;

a communication unit for receiving data through the USB port if the USB port is enabled including prior to the booting process of the portable terminal being completed and before driver loading;

a large-capacity internal memory for storing the received data under the control of the controller; and the other internal memory for storing the program and data for the booting process, a DRAM for temporarily storing the data received through the USB port, wherein the controller configures a Secure Digital/Multimedia Card SD/MMC) interface for accessing the large-capacity internal memory upon receiving the data through the USB port, and thereafter reads out the data temporarily stored in the DRAM to store the data into the large-capacity internal memory through the SD/MMC interface.

12. The portable terminal of claim 11, wherein the controller determines a start address and a size of the DRAM to read out data from the DRAM by the determined size in a First Input First Output (FIFO) manner starting from the start address, and writes the read-out data into the large-capacity internal memory.

13. A computer system for downloading content from a computer system to a portable terminal, the apparatus comprising:

a controller for:

generating a binary file comprising content to be downloaded to the portable terminal; and examining whether a Universal Serial Bus (USB) port is enabled during a booting process of the portable terminal; and wherein the controller performs an operation of a OneNAND™ boot-loader for setting a clock by enabling a Dynamic Random Access Memory (DRAM) and for enabling a General Purpose Input Output (GPIO), performs an operation of an Ethernet boot-loader for initializing hardware components, and detects whether the USB port is enabled during the operating of the Ethernet boot-loader;

a communication unit for transmitting prior to the booting process of portable terminal being completed and before driver loading the binary file to the portable terminal by using a USB downloader under the control of the controller if the USB port is enabled, wherein the USB downloader obtains a register value having sector number information of a large-capacity internal memory of the portable terminal and sets a total number of sectors to the obtained value when the binary file is downloaded.

14. The computer system of claim 13, wherein the communication unit transmits the binary file before driver loading during the booting process of the portable terminal.

15. The computer system of claim 13, wherein the controller generates a base file for indicating version information and a list of selected content, and generates a binary file comprising the selected content and the base file.

16. The computer system of claim 15, wherein the base file is a file for indicating content which must not be deleted.

* * * * *

UNITED STATES PATENT AND TRADEMARK OFFICE
CERTIFICATE OF CORRECTION

PATENT NO. : 8,607,038 B2  Page 1 of 1
APPLICATION NO. : 12/696258
DATED : December 10, 2013
INVENTOR(S) : Woo-Kwang Lee et al.

It is certified that error appears in the above-identified patent and that said Letters Patent is hereby corrected as shown below:

In the Claims:

Column 9, Claim 3, Line 7 should read as follows:
--...memory, wherein the other internal memory stores the program...--.

Column 10, Claim 11, Line 34 should read as follows:
--...the booting process using...--.

Signed and Sealed this
Twenty-fifth Day of March, 2014

Michelle K. Lee
*Deputy Director of the United States Patent and Trademark Office*